United States Patent [19]

Shipp et al.

[11] 3,832,056

[45] Aug. 27, 1974

[54] DISTANCE MEASURING DEVICE USING ELECTRO-OPTICAL TECHNIQUES

[75] Inventors: John I. Shipp; Robin H. Hines; William L. Hollinshead; Thomas D. Broadbent, all of Tullahoma, Tenn.

[73] Assignee: AGA Corporation, Secaucus, N.J.

[22] Filed: Mar. 13, 1972

[21] Appl. No.: 234,018

[52] U.S. Cl............... 356/5, 356/4, 343/12 R, 250/221
[51] Int. Cl............... G01c 3/08, G06m 7/00
[58] Field of Search.............. 250/221; 356/4, 5; 343/12 R

[56] References Cited
UNITED STATES PATENTS

| | | | |
|---|---|---|---|
| 2,966,090 | 12/1960 | Scholdstrom | 356/5 |
| 3,365,717 | 1/1968 | Holscher | 343/12 R |
| 3,446,971 | 5/1969 | Ruddock | 356/5 |
| 3,619,058 | 11/1971 | Hewlett et al. | 356/5 |
| 3,621,268 | 11/1971 | Friedrich | 250/221 |
| 3,690,767 | 9/1972 | Missio et al. | 356/5 |
| 3,740,141 | 6/1973 | Dewitt, Jr. | 356/5 |

OTHER PUBLICATIONS
Nakazawa, Japan Electronic Engineering, 7-1971, No. 56, pp. 30-36.

*Primary Examiner*—Maynard R. Wilbur
*Assistant Examiner*—S. C. Buczinski
*Attorney, Agent, or Firm*—Lerner, David, Littenburg & Samuel

[57] ABSTRACT

An electro-optical surveying instrument for measuring distance utilizing a frequency modulated laser beam is provided with special positioning of lenses so that there is an internal calibration for the lenses utilized so that an exact measurement can be made of a distance from the plumb point of the instrument to the retroreflector at the point from which the distance is being measured. A digital signal level indicator is provided to give the operator of the instrument an exact indication of the strength of the return beam so that he knows exactly whether a reading can be made under a given condition. Electronic logic is provided within the instrument to cancel all second harmonic distortions. The surveying instrument itself is provided with a photo optical switch which allows the instrument to be turned on or off without the need for touching the instrument so as not to in any way affect the exact position of the instrument when a reading is being made. Further, a minimum number of frequencies are utilized to modulate the laser beam while receiving the same range as with instruments utilizing greater numbers of frequencies to modulate the laser.

19 Claims, 4 Drawing Figures

DISTANCE MEASURING DEVICE USING ELECTRO-OPTICAL TECHNIQUES

BACKGROUND OF THE INVENTION

Electro-optical equipment for distance measurement has been known for many years. With the advent of different sources of light intensity, new retroreflectors, advances in electronic and computer technology, it has been possible to increase, significantly, the range and accuracy of these instruments so that they become a necessary tool for the surveyor. In the past, a laser distance measuring device was operative to transmit a coaxial beam at a retroreflector positioned at a target. This beam was then returned to the instruments coaxially and focused onto a receiving photodiode. Through various methods including an iris or variable aperture, the intensity of the returned light is controlled. The laser is modulated by a multitude of frequencies with the distance accuracy being determined by the number of frequencies utilized to modulate the laser. The light impinging upon the photodiode from the distance reflector is then compared to the light impinging on the photodiode from the internal path of light of the laser and substracted one from the other to obtain the range measured (the range equal to twice the actual distance to the target). Then, an internal correction must be made for inaccuracies in the instrument, which are constant, as the actual distance measured is not the distance from the plumb point of the instrument to the target. After the instrument has been built, measurements are taken to determine the instrument correction factor and provision is made for dialing in the instrument correction factor so that the reading of the instrument will be accurate. To this time, there has been no means for designing the instrument so that such instrument correction is not required.

In order for the system to operate properly, the return signal must be of sufficient intensity so as to give a clear reading, well within the sensitivity of the instrument, and one which can be easily read without error. Further, the signal should not be too high, as this type of signal with its sharp wave fronts also create problems. In the past other instruments have utilized meters to indicate to the user of the instrument that the incoming signal was in the correct range for a reading. However, any meter, of the so-called analog type, has a built in averaging factor and does not indicate when only one or two of every fifty pulse signals is of sufficient strength to be read. In such a situation an averaging type meter will indicate that there are no signals which can be read and the surveyor would normally give up hope of measuring. However, if a meter could be provided which would indicate to the user that at least some signals are coming in which are useable, the surveyor can wait until sufficient signals have been received by the instrument over a greater period of time so as to get a complete and accurate reading.

For reasons that have never been wholly explained, when one averages a frequency modulated laser beam over a number of readings to come up with a desired distance measurement, there appear to be a wide range of errors created by a form of second harmonic distortion, which second harmonic distortion can, in fact, create significant misreadings. To avoid this, in the past, this type of error has been corrected by inserting a coil or other 90° phase shifting element into the system after half of the readings were completed, prior to averaging, then shifting the outgoing signal by 90° through a coil for the next set of readings so that, during averaging, all of second harmonic distortions would be canceled out, assuming the second harmonic distortion remained the same during the next group of readings.

In the past, where measurements were being made of long distances, it was well known that one had to have more than one frequency when the distance to be measured was longer than one half the wave length of the modulating frequency. Utilizing this system, the first wave length was normally set so as to read the first unit of measurement, for example, up to X.XXX meters. Combining two frequencies, it is possible to get a phase measurement which would give the information for XO.OO measurement which in combination with the first measurement would give up to 99.999 meters in range. With a third frequency, the range could be expanded to OXOO.OOO meters in range thus giving a total range of XXXX.XXX meters range. It was thought that, utilizing this system, four frequencies were required to achieve the accuracy necessary to measure XXXX.XXX in range.

The surveying instrument of the type above described is quite delicate in that one is measuring very, very exact distances over long ranges and it is extremely necessary to maintain no movement of the instrument during measurement which could cause error. Up until now, one of the major problems of the instrument was turning it on and off. To push a button for the instrument to start up might well move the instrument even very slightly so as to cause an error. To avoid this problem, various types of capacitive switches were developed which required only that the surveyor touch the instrument to turn it on or off. However, there has been no touchless switch for a surveying instrument which would effectively avoid all of the problems relating to turning the instrument on and off which have been found in the past.

SUMMARY OF THE INVENTION

The internal calibration of the instrument can be effected by placing the optics and selecting the path length in such a manner that the equation R = E minus I is exactly satisfied by the instrument wherein:

R is the range measured

I is the internal optical path length from the laser to the photodiode and

E is the external optical path length from the laser, to the object being measured back to the photodiode.

The system can be set up so that the instrument offset is simply and accurately determined as a measure of the placement between the plumb point of the instrument and the zero offset plane. Thus, one need merely move the plumb point of the instrument in its manufacture to obtain zero offset. Alternatively, if there is a value for the offset other than zero, by understanding the equations by which such offset is calibrated even before the instrument is put together, it is only necessary to place such information into the logic computor memory which would then automatically compensate for the instrument error with each measurement.

The present system further includes a digital signal level indicator which gives a digital visible indication of the level of incoming pulses to indicate whether any pulses are available which can be read by the instrument. In this regard, for every thirty two pulses that are received, one pulse is sampled as to its level, and that level is indicated on a digital display and held for 32 additional pulses until another measurement can be made. This gives sufficient time for the viewer to observe the value of these sampled pulses without the necessity of averaging the level of all of the pulses during any given period. By utilizing selected pulses and then holding their result for the 32 pulse count, it is possible to obtain an indication of the value of at least one pulse in every thirty two. Further, a system which measures these pulses, is further operative to thus space the sampling of pulses so that the pulses are not taken too close together which might cause an inaccurate reading to be received wherein there is a short time period fluctuation of the signal received. By sampling at spaced intervals the short irregularties can be averaged out over a longer period of time.

The digital signal level indicator further provides means for signaling the computer to select only signals of a given level and, when dealing with the less significant figures, in measurement, can provide a greater window of pulses which can be utilized for measurement.

In contradistinction to the prior art utilization of shifting, 90°, the phase of the modulated signals applied to the laser, the present invention contemplates electronic phase shifting in the logic circuit associated with the reference oscillator so that there is truly effective, exact, 90° phase shift of the signal. It will easily be understood that, when coils were used to obtain the 90° phase shift, a given coil could provide a different impedance for different frequency signals and, thus, it may not be possible to have an exact 90° phase shift for each of the signals which were included in the modulating signal applied to the laser. Since there are a plurality of frequencies applied thereto, it is possible to have minute variations in delay which can cause errors. By electronically phase shifting the signals as in the present invention, this type of error is avoided.

The "off-on" switch for the surveying instrument of the present invention is operative by utilizing a photoemitting diode energized from the high frequency source of the instrument itself so as to emit light at that high frequency level. Adjacent the photoemitting diode is a photosensitive semiconductor which, of course, will pick up lights and produce an electrical signal in accordance therewith. Ordinarily, the photoemitting diode's light is not directed at the phototransistor and, therefore, does not effect the phototransistors at all. The only light which hits the phototransistors is ambient light and this is at a very low frequency (sun light is almost a steady state). The output of the photosensitive semiconductor is connected through a high pass filter to an amplifier. When light from the photo emitting diode is reflected back onto the photosensitive diode, an electrical signal proportional in frequency to the frequency of the energization of the photoemitting diode is transmitted, through the high pass filter, to the amplifier of the instrument, thus giving a start pulse. It is thus only necessary to reflect the output light of the photo emitting diode back on to the photosensitive device surface to turn "on," or provide a start signal to the instrument. If one's finger is placed relatively close to the photoemitting diode it will, effectively, provide such reflective surface so as to achieve this result. It is thus possible to initiate a start signal without touching the instrument as it is only necessary to go near enough to the photo emitting diode so as to cause reflection of light emitted therefrom back onto the photosensitive device in the instrument.

In the present system, three frequencies are used to modulate the laser beam with the first return phase data being operative to develop a signal up to 10 meters, the second return phase data from the second frequency, being operative to combine with the first phrase signal to provide significant numbers which can be utilized between 10 and 1000 meters; and the third phase data received at the third frequency, when combined with the first and second frequency signals, being operative to provide the significant figure $10^4$ meters. It would further be obvious, that the system can be operated to provide an output either in meters or in feet depending upon the system utilized. Thus, it will be seen that the metric instrument reading will require three calculations and will be composed as follows:

| X | XX | X.XXX | meters where
$R_{1m} = \phi 1/1000$
$R_{2m} = R^3 [(\phi_1 - \phi_2) - (\text{units digit}, R_{1m})]$
$R_{3m} = R^4 [(\phi_1 - \phi_3) - (\text{tens digit}, R_{2m})]$
Then
Range$_m$ = 1000 $R_{3m}$ + 10 $R_{2m}$ + $R_{1m}$ meters This is then rounded off to the nearest tens of meters, and is then rounded off to the nearest thousands of meters.

DETAILED DESCRIPTION OF THE DRAWINGS

Figure 1:
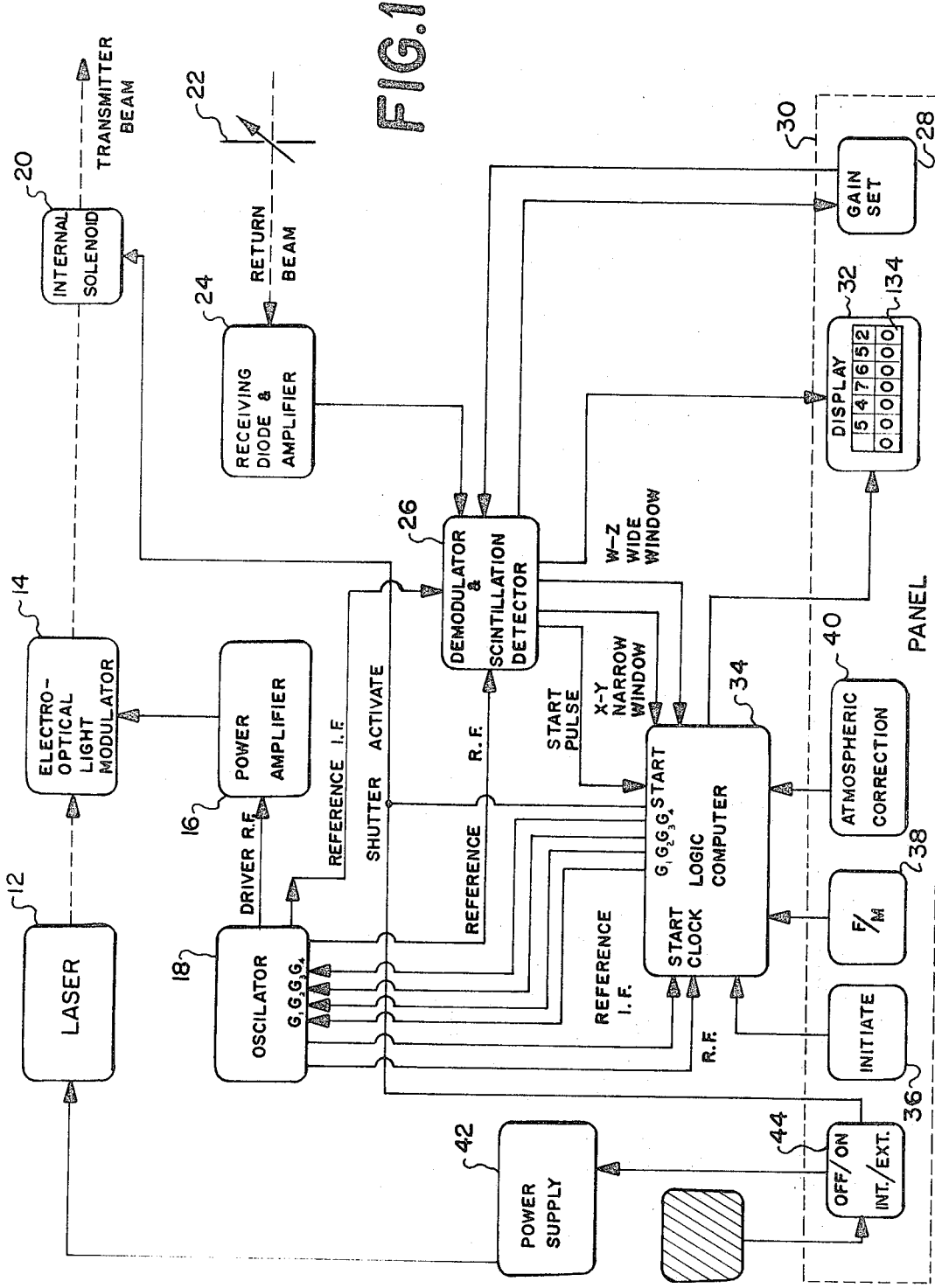
FIG. 1 is a block schematic diagram of distance measuring instrument of the present invention.

In FIG. 1, the distance measuring instrument of the present invention is generally designated by the numeral 10. The instrument 10 includes a helium-neon laser 12 (Hughes Model 3180) which is modulated at three frequencies by an electro-optical light modulator 14 (Isomet KD*P) which includes a potassium deuterium phosphate crystal. The electrical optical light modulator 14 is controlled by a signal received from a power amplifier 16, which amplifier amplifies one of the output signals from an oscillator 18.

The oscillator 18 transmits to the power amplifier 16 a signal at an upper side band frequency ($F_1$) equal to the sum of the reference frequency ($F_1'$) of a crystal oscillator in the oscillator 18 and an intermediate frequency that is derived from and is $10^4$ less than the reference frequency. The phase measurement is made at the intermediate frequency obtained by down converting the received frequency with the reference frequency. Within the oscillator module 18, the reference frequency is divided by $10^2$ and $10^3$ to obtain signals of approximately 150KHz and 15KHz. These two signals are combined with the basic reference signals ($F_1'$) to obtain two other reference signals ($F_2'$) and ($F_3'$) respectively. The two new references signals are then combined with the intermediate frequency to obtain two other transmission signals $F_2$ and $F_3$. By appropriate analog gating techniques, the transmission and reference signals are activized in pairs $F_1$ and $F_1'$, $F_2$ and $F_2'$, and $F_3$ and $F_3'$ by corresponding logic gates from the logic computer to the gate inputs $G_1$, $G_2$ and $G_3$ respectively. Thus, all required frequencies are obtained from a single oscillator crystal. A terminal $G_4$ is provided for the oscillator 18 so that, in a manner which will be discussed below, after 50 pulses have been counted, the oscillator 18 will be shifted in phase 90° for the next 50 counts. Counting in this way, eliminates all distortions due to the second harmonics, which distortions have been previously been effected by placing 90° phase shifters between the power amplifier 16 and the electro-optical light modulator 14. By doing the phase shifting electronically, rather than by inserting a loss member, more arcuate readings are possible without distortion to the transmitted signal.

It should be noted, for reasons which will be discussed below, that only three reference frequencies are required when spanning a range, which is capable of providing the same distance measurement as distance measuring instruments utilizing four reference frequencies.

Figure 2:
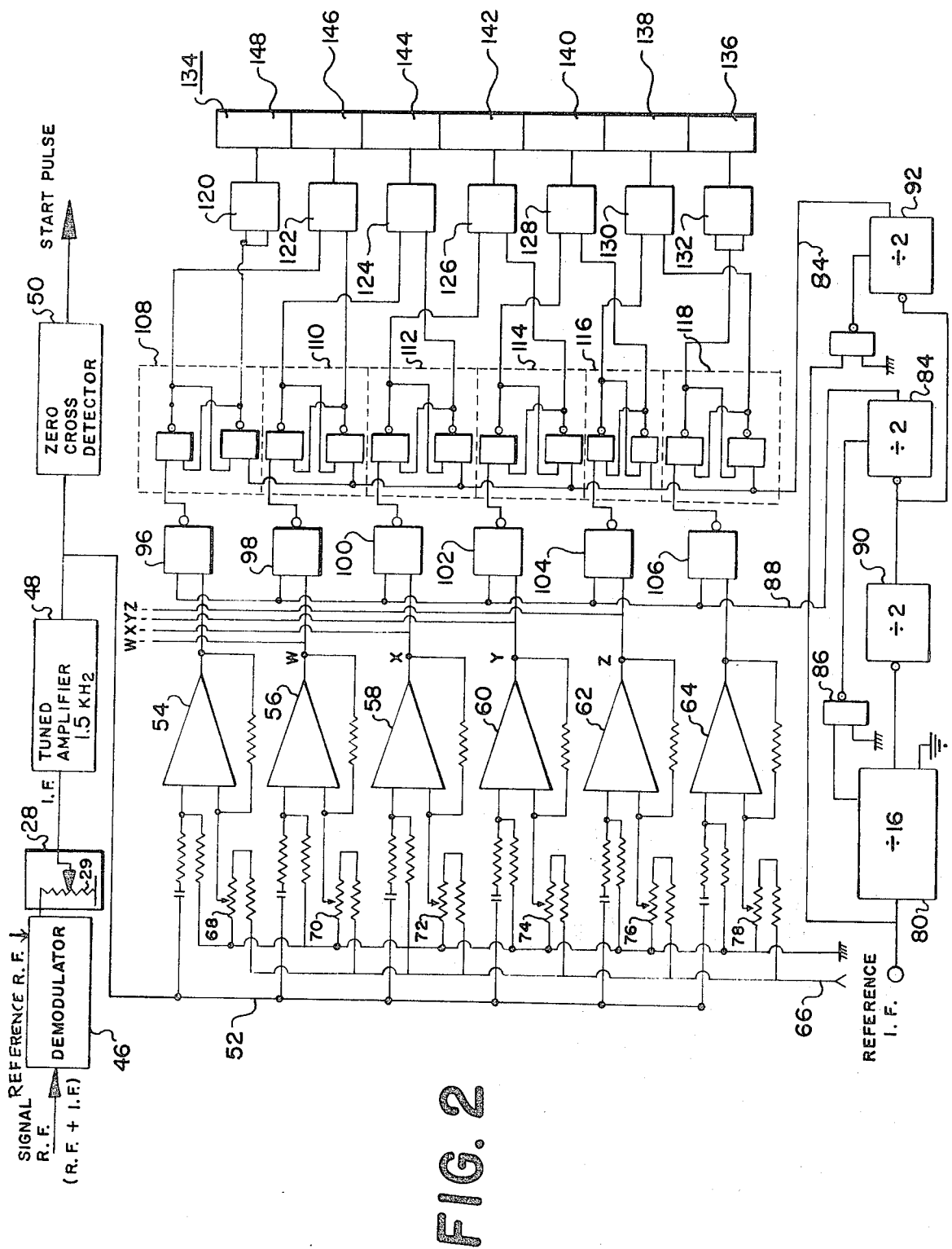
FIG. 2 is a block diagram of the modulator and scintillation detector and display shown in FIG. 1.
Figure 3:
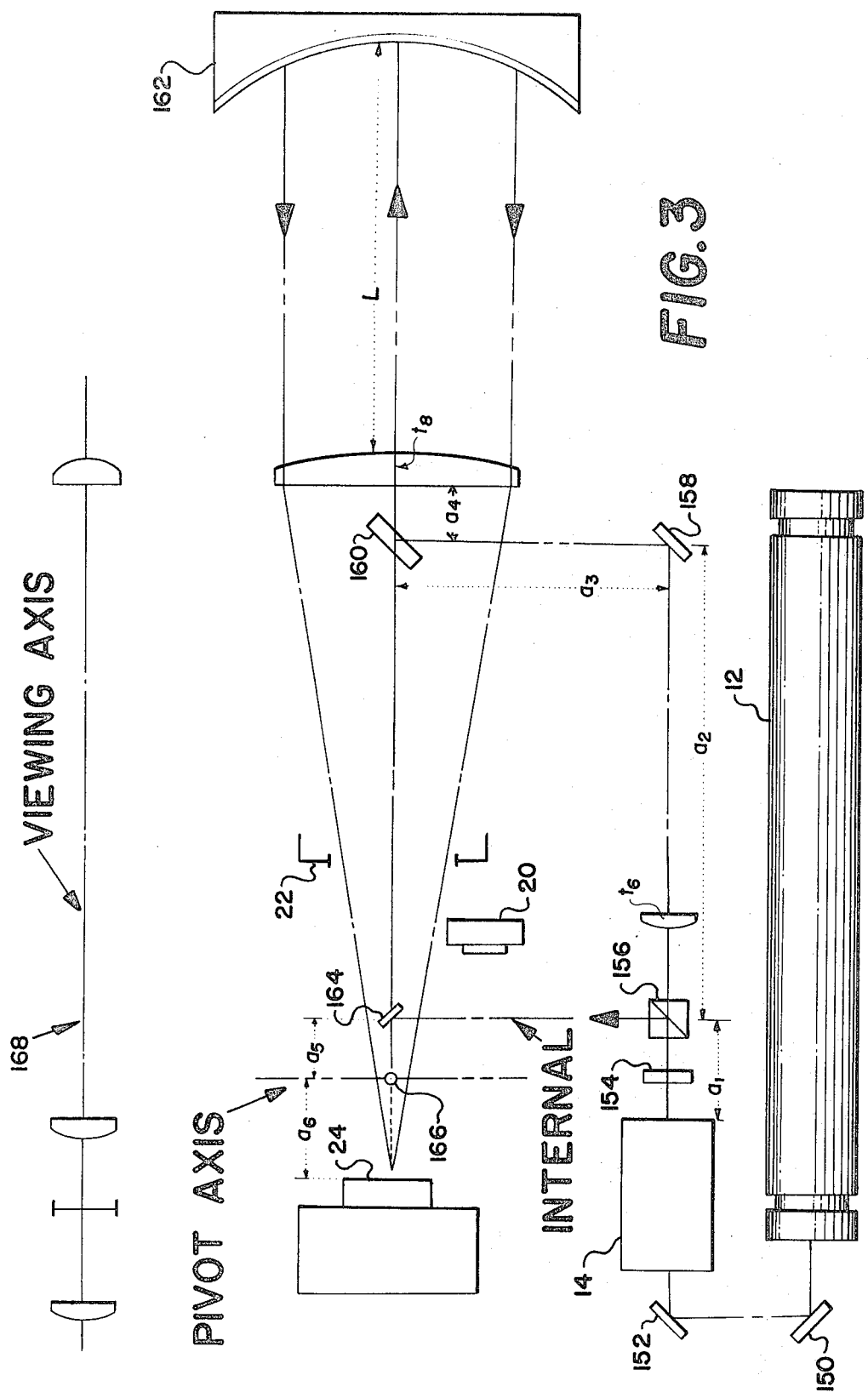
FIG. 3 is a diagrammatic showing of the lens system of the present invention.

The output from the electro-optical light modulator is transmitted through an optical system best shown in FIG. 3 and controlled by an internal solenoid 20 and directed at a target retroreflector. The beam is transmitted coaxial to the retroreflector so that the return light beam is received back through an iris diaphragm 22 onto a receiving diode and amplifier 24. The iris diaphragm 22 is variable so that it may be properly set at a desired return signal level. The receiving diode and amplifier 24 includes a photo diode (Texas Instruments Integral diode and Amplifier TIXL–79). The output of the receiving diode and amplifier 24 is fed to a demodulator and scintillation circuit 26. This return radio frequency signal is demodulated with respect to the reference RF signal from oscillator 18 which also supplies the reference IF to the demodulator and scintillation detector 26. The gain of the intermediate frequency signal is set by a gain control knob 28 on the panel 30 of the instrument. Also on the panel 30 is a suitable display 32 which consists of a series of seven bulbs 134 which indicate the signal level being received by the receiving diode and amplifier 24. The display is set up so that one attempts to make sure that only the center bulb of the seven bulbs 134 is in fact operative indicating that a correct signal is being received for measurement. The operation of this circuit will better be discussed with respect to FIG. 2. Also in the display 32 there is shown the seven figures of the final measurement being made.

It should be noted that for each signal being read, the instrument is calibrated for the internal path of the instrument itself so that the final distance measured is in fact the distance from the plumb center of the distance measuring instrument to the refroreflector at the target. The demodulator and scintillation detector 26 feeds a start pulse to a logic computer 34 which does the measurement for the distance and provides the final distance measurement to the display 32. The logic computer 34 is supplied with the reference IF signal and the clock signal from the oscillator 18. The start up of the instrument is controlled by a suitable start button 36 on the instrument panel itself, which is more fully described in FIG. 4. The panel 30 further has thereon a switch 38 which merely sets the logic 34 so that a readout will be in either feet or meters depending upon the needs of the user. Atmospheric correction is supplied to the logic circuit by a control 40 on the instrument panel and, thus, at the end of any given reading, a suitable correction will be made for the particular atmospheric conditions so that one will provide a direct reading on the display 32 of the actual distance measured.

The entire instrument 10 is supplied suitable power from a power source 42 and the solenoid 20 is operated by suitable "Off" "On" and internal external control 44. There is no need for calibrating internal offset in the instrument for reasons that will be discussed with respect to the arrangement in FIG. 3.

Since the phase measurement is made at an intermediate frequency, the return signal at the intermediate frequency is obtained by mixing at the demodulator 26 the return RF with a reference signal that differs from the transmitted signal by 1.498 KHz. Three frequencies are involved, as was discussed previously. They will produce three readings, $\phi_1$; $\phi_2$; and $\phi_3$. $\phi_1$ will provide a reading from 0.1 ft. to 10 ft. or 1 mm to 10 mm; $\phi_2$ will provide a reading from 10 ft. to 1000 ft. or 10 m to 1 km; and $\phi_3$ will provide readings from 1000 ft. to 10,000 ft. or 1 km to 10 km.

The phase measurement is made between the start pulse zero cross detection 50 of FIG. 2 to the logic circuit 34 and a stop pulse at the reference I.F. which is received from the oscillator 18. Since the clock pulses are measured between the start pulse and the stop pulse, the total count is a fractional part of the half wave length of the modulated frequency. For the basic frequency, $F_1$ equal 14.989625 MHz with a half wave length of ten meters, the least count is one millimeter. The other frequencies of $F_2$ equal 14.974635 MHz and $F_3$ equal 14.839279 MHz are used to determine the range.

Using the general functional requirements, the first step is to acquire phase data:

| | | |
|---|---|---|
| 1. $F_1$, $\Psi_1$, return | | |
| 2. $F_1$, $\Psi_2$, return | 0 – 10 | meters ⎤ |
| 3. $F_1$, $\Psi_1$, calibrate | 0 –100 | feet   ⎦ $\phi_1$* |
| 4. $F_1$, $\Psi_2$, calibrate | | |
| 5. $F_2$, $\Psi_1$, calibrate | | |
| 6. $F_2$, $\Psi_2$, calibrate | 10 – 1000 | meters ⎤ |
| 7. $F_2$, $\Psi_1$, return | 100 – 10⁴ | feet   ⎦ $\phi_2$* |
| 8. $F_2$, $\Psi_2$, return | | |
| 9. $F_3$, $\Psi_1$, return | | |
| 10. $F_3$, $\Psi_2$, return | 1000 – 10⁴ | meters ⎤ |
| 11. $F_3$, $\Psi_1$, calibrate | $10^4$ – $10^5$ | feet   ⎦ $\phi_3$* |
| 12. $F_3$, $\Psi_2$, calibrate | | |

*$\phi_1$, $\phi_2$, $\phi_3$ are summations of $\Psi_1$, $\Psi_2$, acquired in return and calibrate positions on respective frequencies.

The American system instrument reading will require three calculations and will be composed as follows:

$$| \text{ X } | \text{ XX } | \text{ X.XX } | \text{ feet}$$
$$\quad\uparrow\qquad\uparrow\qquad\uparrow$$
$$\quad R_{3A}\quad R_{2A}\quad R_{1A}$$

where,
$R_{1A} = \phi_1/100$
$R_{2A} = R^1[(\phi_1 - \phi_2) - (\text{units digit}, R_{1A})]$
$R_{3A} = R^2[(\phi_1 - \phi_3) - (\text{tens digit}, R_{2A})]$
then
$\text{Range}_A = 1000R_{3A} + 10R_{2A} + R_{1A}$ feet $R^1$ indicates that $R_{2A}$ is rounded off to nearest tens of feet. $R^2$ indicates that $R_{3A}$ is rounded off to nearest thousands of feet.

The metric system instrument reading will require three calculations and will be composed as follows:

$$\underset{R_{3M}}{|\ X\ }\ \underset{R_{2M}}{|\ XX\ }\ \underset{R_{1M}}{|\ X.XXX\ |}\ \text{meters}$$

where, $R_{1M} = \phi_1/1000$
$R_{2M} = R^3\ [(\phi_1 - \phi_2) - (\text{units digit, } R_{1M})]$
$R_{3M} = R^4\ [(\phi_1 - \phi_3) - (\text{tens digit, } R_{2M})]$ then $\text{Range}_M = 1000R_{3M} + 10R_{2M} + R_{1M}$ meters $R^3$ indicates that $R_{2M}$ is rounded off to nearest tens of meters. $R^4$ indicates that $R_{3M}$ is rounded off to nearest thousands of meters.

For example, if $\phi_1$ was measured at 1348.642; $\phi_2$ at 1335.156; and $\phi_3$ as 1347.293 and $R_{1A}$ equals to 8.642; $R_{2A}$ equals 1348.642 − 1335.156 − .086 or 0340.000; and $R_{3A}$ equals 1348642 − 1347.293 − .349 or 1000.0-0. Thus the distance measured would be 1348.642 meters.

In FIG. 2, there is a more detailed description of the operation of the demodulator and scintillation detector 26 display 32, and gain set 28.

As was described previously, the demodulator and scintillation detector 26 receives a return signal that is the upper side band of the reference signal and the intermediate frequency in a phase displaced relationship in accordance with the distance traveled. This signal RF is fed to a separate demodulator 46 and mixed with the reference RF to produce a resultant IF signal which is more easily measured. The output of demodulator 46 is fed through a gain set potentiometer 28 to a tuned amplifier 48 which is tuned to amplify the IF signal which is approximately 1.5 KHz. A zero cross detector 50 produces a start pulse which starts a pulse signal when the output of tuned amplifier 48 crosses zero going negatively, which start pulse is the start pulse shown in FIG. 1 fed through the logic computer 34.

The output of tuned amplifier 48 is also supplied along a common input line to a group of six comparator circuits 54, 56, 58, 60, 62 and 64. The comparator circuits 54 56, 58, 60, 62 and 64 have one input connected through a suitable capacitor and resistor to line 52 and the other input thereof connected from a source of DC potential on line 66 through respective calibrator resistors 68, 70, 72, 74, 76 and 78. The calibrating resistors 68, 70, 72, 74, 76 and 78 are set so that they will provide different voltage levels from the lowest voltage level being at the input of the amplifier 64, to a higher voltage level in comparator 62 and a still higher level at comparator 60; and so on to the highest level in comparator 54. Unless the input on line 52 exceeds the reference potential on a particular comparator, there will be no output for the comparator. Thus, low level signals might only produce outputs at the comparators 64 and 62 and not any comparator thereabove. It is to be noted that the outputs of the comparators 56, 58, 60 and 62 have been respectively designated as W, X, Y and Z. Thus, it is intended with a good return signal, that the amplifier signal should be sufficiently high so as to energize either comparator 58 and/or 60, but it is sufficient for the secondary measurement that, at least, the comparators 56 or 62 can be used. Thus, on the first frequency signal used, it is desired to measure only signals which pass through comparator 60 as a greatest lower boundary but do not pass through comparator 48 as a least upper boundary. For this reason, these XY pulses are supplied to the logic computer as part of the narrow window pulse shown in FIG. 1. After the frequency F1 has been measured, and the secondary frequencies are used, there is a switch-over to the wide window signal of W through Z and that signal is also supplied to the logic computer 34. It will be understood that it is possible to vary the signals levels by one or two means. First, by varying the gain set potentiometer 28 as shown in FIG. 2 or by varying the iris opening 22 in FIG. 1 so as to control the amount of the return signal.

It will be understood that the window pulses are operative to control whether the logic computer will read a particular signal or will not read that particular signal. That is, if the X-Y narrow window is enabled, it allows the logic computer to read the pulses being fed thereto. If it is not enabled, no pulse will be read. This is to avoid ambiguous signals such as would occur with very low level signals or, very high level signals caused by spurious reflections and the like.

It is very desirable for the operator of the instrument to know whether the return signal fits within the window to be measured so that he can adjust the gain set 28 or iris 22 to achieve exact readings. In the past, an analog meter was used to determine whether the return signal level was within a desired range to be measured. However, when only one or two signals were being received which were within range, the analog meter was unable to detect such signals as it integrated return signals over a period of time and, accordingly, the operator believed that he could not take a reading when in fact there were some signals which were capable of being read. The only problem was that it would take a long time to receive sufficient signals to give a proper reading. However, in distance surveying, it is not unreasonable for an instrument to be set for a reading and to wait a minute or two for the purposes of determining or obtaining sufficient return signals at proper levels to give an accurate reading. This, effectively, enhances the range of the instrument if the operator knows that he can get some signals of value for a reading. For this reason, every thirty seconds a pulse of the up frequency (every 22 milliseconds) is fed forward in a manner which will be discussed below to determine at what level the signal has been received. For this purpose, the reference IF at 1.5 KHz is applied to a divider circuit 84 through a gate 86 to produce a pulse on line 88 for every 32 pulses received at the input divider 80. Similarly, through the use of two divider circuits 90 and 92, a pulse is received on line 94 also every 32 pulses but these pulses occur immediately before the pulses on line 88. The pulses on line 94 thus clear the flip flops to await the next impulse for resetting. Line 88 is connected to a series of gates 96, 98, 100, 102, 104 and 106 which have connected to their other inputs the outputs, respectively, of the comparators 54, 56, 58, 60, 62 and 64. Thus, if there is a signal on both the inputs at one of the gates 96, 98, 100, 102, 104 and 106, then there is a signal at their output. The output of each one of these gates 96, 98, 100, 102, 104 and 106 is applied to a flip flop circuit 108, 110, 112, 114, 116 and 118 respectively. It should be noted that the flip flop circuits 108, 110, 112, 114, 116 and 118 are connected up to seven gates 120, 122, 124, 126, 128, 130 and 132 whose outputs control seven lamps 134, with the lowermost lamp designated as 136 and the remaining lamps being in order of the magnitude 138, 140, 142, 144, 146 and 148. Lamps 134 are part of the display 32 shown in FIG. 1. It will be noted that even if the lowermost flip flop 118 is not energized, one of its outputs, connected to the gate 132 will have a voltage thereon energizing lamps 136. This will indicate that there is not even a minimum signal level along the input line 52. If there is an input on line 42 sufficient to cause the comparator 64 to have an output signal, and that signal is present on the thirty second pulse as it is transmitted on Line 88, then gate 106 will transmit a pulse to flip flop 118, causing it to reverse, shutting off the gate 132, and therefore turning off light 136 and providing a signal to the lowermost terminal of gate 130. The gate 130 only passes signals when both of its inputs have a signal thereon. Since gate 116 does not have an input thereto, its uppermost terminal does have a signal thereon causing neon line 138 to be turned on. This would be the only lamp that would be turned on. Similarly, working up the line, when comparator 62 is energized, the gates 104 and 106 have a signal thereon, preventing gate 130 from operating but allowing gate 128 to pass a signal to light the lamp 140. It can thus be seen that lamp 142 is comparable to having a signal at terminal Y and it will be normal for the operator to set gain set 28 and the iris 22 at a level so that the neon lamp 142 is always being lit. It should further be noted that the logic computer is operative so that when the beam first is at $F_1$ is transmitted by the laser 12, its only return beam is measured when the signals fit within the X-Y narrow window. However, when there is a switchover to frequencies $F_2$ and $F_3$, the logic computer will accept signals fitting within the wider window W-Z.

The signal on line 94 is operative to reset all of the flip flops 108, 110, 112, 114, 116 and 118 back to their original positions. In between, pulses are being received so that each succeeding pulse can be read. It should be further noted that in effect a signal is being sampled every thirty two pulses to determine whether the return signal is sufficient for the range to be measured and that signal is being applied through bulbs 134 which have a time build up and decay period far longer than the length of any single pulse. Thus the sampled pulse serve the purpose of providing a longer signal to operate the fast response (22 millisecond rise time) filament bulbs and the bulbs provide the service of supplying a visual signal over a longer period of time indicating the level at which an individually sampled signals is being received by the instrument.

In FIG. 3, there is shown the optical system for the distance measuring device of the present invention. That is, as was previously discussed, the laser 12 transmits a beam through reflected mirror 150 and 152 to electro-optical light modulator 14. The light modulator 14 then transmits its signal through analyzer 154 to a beam splitter 156. The beam splitter 156 sends the output of the laser directly through a lens t6 into a 45° mirror 158. The distance between the center of the beam splitter 156 and the mirror 158 is $a_2$. The distance between the output of the electro-optical light modulator 14 and beam splitter 156 is $a_1$. Light transmitted through beam splitter 156 to mirror 158 is then reflected off a second mirror 160 toward the target which is in the form of a retroreflector 162. The distance between mirror 158 and mirror 160 is $a_3$. Light bouncing off mirror 160 passes through a lense $t_8$ toward the retroreflector 162. The distance between the outer surface of lense $t_8$ and retroreflector 162 is L. The distance between mirror 160 and the back surface of lense $t_8$ is $a_4$. The returned light of the retroreflector 162 passes back through the lense $t_8$ and is focused on the receiving diode 24.

The beam splitter 156 further transmits the output of electro-optical light modulator 14 toward another mirror 164. Internal solenoid 20 is operative to cut off light returning from retroreflector 162 and prevent a beam from returning to the receiving diode 24 while opening the path between beam splitter 156 and mirror 164. Alternatively, the internal solenoids cuts off the internal light path between beam splitter 156 and mirror 164 and opens the path from the retroreflector 162 to the diode 24. Thus the internal solenoid is utilized to select which path is to be measured, namely, the external path to the target or the internal path all as will be described hereinafter.

The internal path continues from the mirror 164 back to the receiving diode 24. The mirror 164 is positioned so that the distance between beam splitter 156 and mirror 164 is exactly equal to the distance between the mirror 158 and mirror 160 or $a_3$. Further, the distance between the beam splitter 156 and mirror 158 is exactly equal to the distance between mirrors 164 and 160 or $a_2$. The plumb axis of the instrument is designated as 166. This axis can be preset when manufacturing the instrument. The distance between the plumb axis 166 and the mirror 164 as designated $a_5$, whereas the distance from plumb axis 166 to receiving diode 24 is designated as $a_6$.

Most instruments presently made provide a "zero offset" computation or correction switch so that the individual operator must calibrate the instrument for "zero offset." It would be desirable to avoid the necessity of this type of computation in the field and to build an instrument with a true zero offset without any need for precalculation in the field. To achieve this, the present invention is operative to position lens 164 relative to plumb axis 166, mechanically, on the instrument so that the range actually measured is truly equal to the external light path minus the internal light path without any correction.

To achieve this, the present invention operates as follows:

One views the distance to be measured through a suitable viewing telescope 168 on the instrument. As was indicated, it is desired to measure the range and set it exactly equal to the external optical path length minus the internal optical path.

The range to be measured is given the designation R; The distance from $t_8$ to the point to be measured is designated L; the internal optical path length is designated I; The external optical path length is designated by E; and the index of refraction of the optical material utilized is designated as "$n$."

With a given instrument, it can be seen that the range R equals:

$R = (2a_5 + 2a_2 + 2a_4 + 2t_8 + 2L)$
$I = a_1 + a_3 + a_5 + a_6$
$E = a_1 + 2a_2 + a_3 + 2a_4 + 2t_8 + 2L + a_5 + a_6 + (n - 1)(t_6 + 2t_8)$

For zero offset, the following equation must be met:

$R = E - I$

Therefore, $2a_5 = (n - 1)(2t_8 + t_6)$,
for zero offset:

$$a_5 = (n - 1)/2 \, (2t_8 + t_6)$$

Since $t_8$, $t_6$ are known quantities, it is merely necessary to set the pivot point 166 at a distance which satisfies the above equation. An alternative to the above, where it was not physically possible to change the plumb axis of the instrument or to move lenses 156 and 164 in accordance with the above equation, then, when the value of the equation; $R = E - I + K$ is determined, as above, where "K" is the offset, this amount can be preset into the logic computer 34 so that when all calculations are arranged zero offset is automatically set into the equation. However, it can be understood that by building this amount into the instrument so that there is no zero offset required, one saves on logic computer elements and time of operation.

Figure 4:
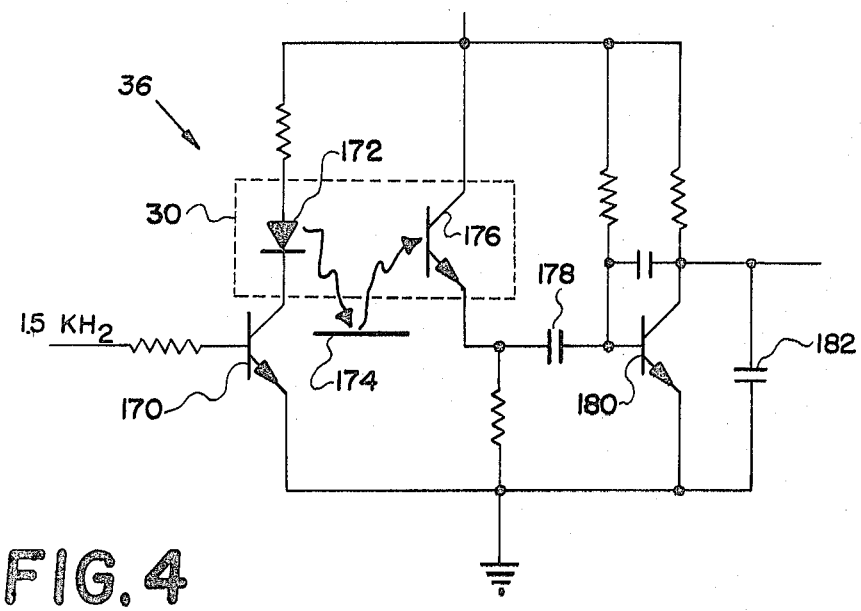
FIG. 4 is a schematic diagram of the switch utilized on the distance measuring apparatus of the present invention.

As one can see, the distance between the measuring device and the present invention is intended for extremely accurate usage. One of the real problems in working with this type of instrument is the simple problem of turning it on and off without anyone disturbing the physical setting of the instrument so as to cause a change to require recalibration for error. It thus would be very desirable to have, as a part of the instrument, a system of turning the instrument on or off for the purpose of initiating measurement which would not require touching the instrument. This device is shown in FIG. 4 and is generally designated as in FIG. 1 by the numeral 36. That is, there is provided a transistor 170 which received a high frequency signal from the reference IF, such that the output of transistor 170 energizes a photo diode 172 which emits light at a frequency of 1.5 KHz. This light emitting diode is on the front panel of the instrument 30 and, if one were to place ones finger or some other external surface 174 adjacent the light emitting diode 172 it would reflect the light upon the photosensitive transistor 176.

The photosensitive transistor 176 is capacitively coupled to a high pass filter 178, and then to the base of a transistor amplifier 180. Thus, normally, ambient light or room light is almost at a D.C. level and, no matter how much such light excites the photosensitive transistor 176, the output thereof will not pass through high pass filter 178 to the base of transistor 180 and there will be no output for a start pulse. However, if light is reflected off surface 174 onto light sensitive transistor 176 from diode 172 then, one would have a pulsating output at 1.5 KHz which would be passed by high pass filter capacitor 178 through transistor 180 causing an initiate pulse to be sensed at the logic computer 34 indicated at the start of operation. It should be noted that it is not necessary for someone to touch the instrument as it is only necessary to bring one's finger close enough to the light emitting diode 172 so as to cause reflection thereof onto light sensitive transistor 176 resulting in an "initiate" pulse.

The output of transistor 180 has a suitable pulse shaping capacitor 182 thereacross.

Although this invention has been described with respect to its preferred embodiments, it should be understood that many variations and modifications will now be obvious to those skilled in the art, and it is preferred, therefore, that the scope of the invention be limited not by the specific disclosure herein, only by the appended claims.

We claim:

1. An electro-optical surveying instrument comprising:
   a. a source of radiation;
   b. radiation modulating means for modulating said source of radiation at one or more frequencies,
   c. reference frequency means for supplying a reference frequency signal to said modulating means, to cause said source of radiation to be modulated at said reference frequency,
   d. radiation sensitive detection means for receiving return radiation signals,
   e. phase comparison means for comparing said reference frequency signal with the return signal to obtain a measurement of the distance said radiation traveled;
   f. external optical path means including the total distance modulated radiation travels from said radiation modulating means through said instrument to a target and back through said instrument to said radiation sensitive detection means;
   g. internal optical path means including the distance modulated radiation traverses from said radiation modulating means through said instrument to said radiation sensitive detection means,
   h. selective means for selectively measuring said internal or external optical path means,
   i. said phase comparison means including computing means for computing the formula $R = E - I + K$;

where
   $R$ = range to be measured
   $E$ = external path
   $I$ = internal path, and
   $K$ = a constant,
   said computing means being operative to produce signals corresponding to the range measured,
   j. display means operative from said computer means for displaying the range measured, said external optical path means and said internal optical path means including a common optical element said instrument having a plumb point from which the range is computed, and said common optical element being positioned relative to said plumb point so as to maintain said constant K equal to zero.

2. The electro-optical surveying instrument of claim 1 wherein said common optical element include a first beam splitter, said first beam splitter being positioned adjacent said radiation modulating means to transmit radiation to said internal and external path means, the position of said beam splitter relative to said plumb point being operative to control the value of said constant K.

3. An electro-optical surveying instrument comprising:
   a. a source of radiation;
   b. radiation modulating means for modulating said source of radiation at one or more frequencies;
   c. reference frequency means for supplying a reference frequency signal to said modulating means to cause said source of radiation to be modulated at said reference frequency;
   d. radiation sensitive detection means for receiving return radiation signals;

e. phase comparison means for comparing said reference frequency signal with the return signal to obtain a measurement of the distance said radiation traveled;
f. return radiation signal comparator means for comparing, with respect to digital levels, on a sampled basis, individual return radiation signals,
g. said phase comparison means including computing means for computing the distance said radiation has traveled;
h. said signal comparator being operative to prevent operation of said computing means unless said individual sampled return radiation signals are within predetermined digital levels, said signal comparator means including sampling means for sampling only one of any group, in time, of individual return radiation signals, and display means operative from said computing means for displaying the range measured, said sample signal being operative to control said display means.

4. An electro-optical surveying instrument comprising:
   a. a source of radiation;
   b. radiation modulating means for modulating said source of radiation at one or more frequencies;
   c. reference frequency means for supplying a reference frequency signal to said modulating means to cause said source of radiation to be modulated at said reference frequency;
   d. radiation sensitive detection means for receiving return radiation signals;
   e. phase comparison means for comparing said reference frequency signal with the return signal to obtain a measurement of the distance said radiation traveled;
   f. return radiation comparator means for comparing, with respect to digital levels, on a sampled basis, individual return radiation signals,
   g. said phase comparison means including computing means for computing the distance said radiation has traveled,
   h. said signal comparator being operative to prevent operation of said computing means unless said individual sampled return radiation signals are within predetermined digital levels, said signal comparator means including plurality of digital level comparators each responsive to a different digital level of return radiation signal, a plurality of digital display means, respectively responsive to each of said digital level comparators to digitally display the level of a return radiation signal.

5. The electro-optical surveying instrument of claim 4 wherein said digital display means are lamps, only one of said lamps being energized at any time in accordance with the highest digital level comparator energized by said individual return radiation signal.

6. The electro-optical surveying instrument of claim 5 wherein said lamps are neon bulbs.

7. The electro-optical surveying instrument of claim 4 wherein said signal comparator means samples only one individual return radiation signal out of a group, in time, of individual return radiation signals, said individual digital display means each being energized for a period of time equal to said sample time, in accordance with the digital level of the sampled individual return radiation signal as applied to said digital signal comparators.

8. The electro-optical surveying instrument of claim 7 including an additional digital display means operative when the return radiation signal is below the lowest level capable of energizing one of said digital comparator means.

9. An electro-optical surveying instrument comprising:
   a. A source of radiation;
   b. Radiation modulating means for modulating said source of radiation at one or more frequencies;
   c. Reference frequency means for supplying a reference frequency signal to said modulating means to cause said source of radiation to be modulated at said reference frequency;
   d. Radiation sensitive detection means for receiving return radiation signals;
   e. Phase comparison means for comparing said reference frequency with the return signal to obtain a measurement of the distance said radiation has traveled;
   f. said reference frequency means applying, sequencially, different reference frequencies $f_1$, $f_2$, and $f_3$ of different orders of magnitude;
   g. said phase comparison means obtaining a phase measurement $\phi$ with reference frequency $f_1$, phase measurement $\phi_2$ with reference frequency $f_2$ and phase measurement $\phi_3$ with reference frequence $f_3$;
   h. said phase comparison means including computer means for calculating the Range $R_A$ in feet as follows:

$$\underbrace{|\text{ X }|}_{R_{3A}}\underbrace{\text{ XX }|}_{R_{2A}}\underbrace{\text{ X.XX }|}_{R_{1A}}\text{ feet}$$

where,
$R_{1A} = \phi 1/100$
$R_{2A} = R^1 [(\phi_1 - \phi_2) - (\text{units digit}, R_{1A})]$
$R_{3A} = R^2 [(\phi_1 - \phi_3) - (\text{tens digit}, R_{2A})]$
then
$\text{Range}_A = 1000 R_{3A} + 10 R_{2A} + R_{1A}$ feet.

10. An electro-optical surveying instrument comprising:
   a. A source of radiation;
   b. radiation modulating means for modulating said source of radiation at one or more frequencies;
   c. Reference frequency means for supplying a reference frequency signal to said modulating means to cause said source of radiation to be modulated at said reference frequency;
   d. Radiation sensitive detection means for receiving return radiation signals;
   e. Phase comparison means for comparing said reference frequency signal with the return signal to obtain a measurement of the distance said radiation has traveled;
   f. Said reference frequency means applying, sequentially, different reference frequencies $f_1$, $f_2$, and $f_3$ of different orders of magnitude;
   g. Said phase comparison means obtaining a phase measurement $\phi_1$, with reference frequency $f_1$, phase measurement $\phi_2$ with reference frequency $f_2$ and phase measurement $\phi_3$ with reference frequency $f_3$;
   h. Said phase comparison means including computer means for calculating the Range $R_M$ in meters as follows:

| X | XX | X.XXX | meters
  ↓     ↓      ↓
 R₃ₘ  R₂ₘ   R₁ₘ where, $R_{1M} = \phi 1/1000$ $R_{2M} = R^3 [(\phi_1 - \phi_2) - \text{(units digit, } R_{1M})]$ $R_{3M} = R^4 [(\phi_1 - \phi_3) - \text{(tens digit, } R_{2M})]$ then $\text{Range}_M = 1000 R_{3M} + 10 R_{1M} + R_{1M}$ meters.

11. An electro-optical surveying instrument comprising:
  a. a source of ranging radiation;
  b. radiation modulating means for modulating said source of ranging radiation at one or more frequencies;
  c. reference frequency means for supplying a reference frequency signal to said modulating means to cause said source of ranging radiation to be modulated at said reference frequency;
  d. radiation sensitive detection means for receiving return ranging radiation signals;
  e. phase comparison means for comparing said reference frequency signal with the return signal to obtain a measurement of the distance said radiation has traveled;
  f. electrical power supply means for supplying electrical energy to operate the instrument; and
  g. initiate means operative to initiate operation of said instrument, said initiate means including a source of light modulated at a high frequency mounted on said instrument, a light sensing means adjacent said light source but out of the path of radiation of said light source and positioned to receive reflected radiation from said light source by means of a reflective surface positioned adjacent said light source but spaced therefrom, electrical filter means connected to the output of said light sensing means to pass only high frequency signals from said light sensing means to initiate operation of said instrument.

12. The electro-optical surveying instrument of claim 11 wherein said high frequency source of light is energized by said reference frequency means.

13. The electro-optical surveying instrument of claim 11 wherein said high frequency source of light is a photo emitting diode.

14. The electro-optical surveying instrument of claim 13 wherein said light sensing means is a photo-sensitive semiconductor device.

15. The electro-optical surveying instrument of claim 14 wherein said electrical filter means is a capacitor connected to the output of said photosensitive semiconductor device.

16. A finger operated switch comprising a high frequency radiation source, radiation sensing means, mounting means for mounting said radiation source adjacent said radiation sensing means but out of the path of said radiation source and said sensing means positioned to relfected radiation from said radiation source when a reflective surface is positioned adjacent said radiation source but spaced therefrom; and high frequency electrical filter means connected to the output of said radiation sensing means to pass only high frequency signals from said radiation sensing means to thus provide a signal indicative of the positioning of a reflective surface adjacent said radiation source; said last mentioned signal operative to initiate operation of equipment associated with said switch.

17. The switch of claim 16 wherein said radiation source is a photoemitting diode.

18. The switch of claim 17 wherein said radiation sensing means is a photosensitive semiconductor device.

19. The switch of claim 18 wherein said high frequency filter means is a capacitor connected to said radiation sensing means.

* * * * *